(12) United States Patent
Shiino et al.

(10) Patent No.: US 7,834,498 B2
(45) Date of Patent: Nov. 16, 2010

(54) MOTOR DRIVE APPARATUS AND ITS INSPECTION METHOD

(75) Inventors: Kohtaro Shiino, Isehara (JP); Hidekazu Shirai, Yamato (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 12/165,893

(22) Filed: Jul. 1, 2008

(65) Prior Publication Data
US 2009/0021091 A1 Jan. 22, 2009

(30) Foreign Application Priority Data
Jul. 18, 2007 (JP) ............................. 2007-186533

(51) Int. Cl.
*H02K 11/00* (2006.01)
(52) U.S. Cl. ...................... 310/71; 310/68 B
(58) Field of Classification Search ................. 310/71, 310/83, 68 B, 68 R
See application file for complete search history.

(56) References Cited
U.S. PATENT DOCUMENTS
2006/0108884 A1* 5/2006 Shiino et al. ............ 310/89

2006/0138883 A1* 6/2006 Yagai et al. ............ 310/71
2008/0211332 A1* 9/2008 Kataoka et al. ............ 310/71

FOREIGN PATENT DOCUMENTS
JP 2004-129362 A 4/2004

\* cited by examiner

*Primary Examiner*—Nguyen N Hanh
(74) *Attorney, Agent, or Firm*—Foley & Lardner LLP

(57) ABSTRACT

A motor drive apparatus includes a motor unit including an output shaft and a first terminal connecting portion; a control board including a second terminal connecting portion, and configured to control a current supply to the motor unit; a housing; a shaft supporting portion supporting the output shaft; and a plurality of relay terminals electrically connecting the first terminal connecting portion with the second terminal connecting portion. The housing includes a motor-unit receiving portion receiving the motor unit, and a board receiving portion formed integrally with the motor-unit receiving portion. The motor-unit receiving portion is formed with an opening on one side of the motor-unit receiving portion in an axial direction of the motor unit and includes a wall portion on another side of the motor-unit receiving portion in the axial direction. The wall portion is formed with a through-hole. The board receiving portion is formed with an opening in the axial direction to receive the control board. The plurality of relay terminals are provided via the through-hole of the wall portion.

17 Claims, 13 Drawing Sheets

US 7,834,498 B2

MOTOR DRIVE APPARATUS AND ITS INSPECTION METHOD

BACKGROUND OF THE INVENTION

The present invention relates to a drive apparatus for a motor serving for a power source of a power-steering apparatus adapted to assist a steering of driver, and an inspection method for the drive apparatus.

Japanese Patent Application Publication No. 2004-129362 discloses a motor drive apparatus which is used in an electric power-steering apparatus. In this technique, a motor housing accommodating or receiving a coil, a stator and the like of a motor is provided as a separated member from a housing receiving a control board (circuit substrate). In this case, a waterproof connector and the like for connecting the control board with the motor are necessary so that a downsizing of the drive apparatus is affected. Therefore, as a countermeasure, it is conceivable that a portion receiving the control board is formed integrally with the motor housing. Thereby, the control board becomes capable of being connected with respective components of the motor inside the integrated housing, so as to achieve the downsizing of the apparatus.

SUMMARY OF THE INVENTION

However, even if the above-mentioned countermeasure is taken, there is the following problem. That is, when a current supply test of the control board is carried out under the state where the motor components have been attached to the control board (the integrated housing), the motor is drivingly rotated so that an inspection workability is worsened. Therefore, it is hoped a motor drive apparatus capable of carrying out the inspection of control board before the assembly (attaching) of motor components and also capable of ensuring an accuracy of attaching position of the motor after the assembly of the motor components will be realized.

It is therefore an object of the present invention to provide a motor drive apparatus and its inspection method, devised to carry out the inspection of the control board before the assembly of motor components, and devised to ensure an accuracy of attaching position of the motor under the state where the motor components have been attached.

According to one aspect of the present invention, there is provided a motor drive apparatus comprising: a motor unit comprising a coil, a stator, an output shaft and a first terminal connecting portion; a control board comprising a second terminal connecting portion, the control board being configured to control a current supply to the motor unit; a housing comprising a motor-unit receiving portion receiving the motor unit, the motor-unit receiving portion being formed with an opening on one side of the motor-unit receiving portion in an axial direction of the motor unit and comprising a wall portion on another side of the motor-unit receiving portion in the axial direction, the wall portion being formed with a through-hole and a board receiving portion formed integrally with the motor-unit receiving portion, the board receiving portion being formed with an opening in the axial direction to receive the control board; a shaft supporting portion supporting the output shaft, the shaft supporting portion being provided at the wall portion; and a plurality of relay terminals provided via the through-hole of the wall portion, the plurality of relay terminals electrically connecting the first terminal connecting portion with the second terminal connecting portion.

According to another aspect of the present invention, there is provided a motor drive apparatus comprising: a motor unit comprising a coil, a stator, an output shaft and a first terminal connecting portion; a control board comprising a second terminal connecting portion, the control board being configured to control a current supply to the motor unit; a housing comprising a motor-unit receiving portion receiving the motor unit, the motor-unit receiving portion being formed with an opening on one side of the motor-unit receiving portion in an axial direction of the motor unit and comprising a wall portion on another side of the motor-unit receiving portion in the axial direction, the wall portion being formed with a through-hole and a board receiving portion formed integrally with the motor-unit receiving portion, the board receiving portion being formed with an opening in the axial direction to receive the control board; a rotation sensor provided at the wall portion, the rotation sensor being adapted to detect a rotational state of the output shaft; and a plurality of relay terminals provided via the through-hole of the wall portion, the plurality of relay terminals electrically connecting the first terminal connecting portion with the second terminal connecting portion.

According to still another aspect of the present invention, there is provided an inspection method for a motor drive apparatus, comprising: a step of assembling a subassembly, the subassembly comprising a control board configured to controllably drive a motor, and a housing comprising a motor receiving portion formed with an opening on one side of the motor receiving portion in an axial direction of the motor, the motor receiving portion comprising a wall portion on another side of the motor receiving portion in the axial direction, the wall portion being formed with a through-hole, and a board receiving portion formed integrally with the motor receiving portion, the board receiving portion being formed with an opening in the axial direction to receive the control board; a step of connecting an terminal of an inspection unit to the control board; and a step of carrying out an inspection of the control board by inputting a test signal from the inspection unit to the control board.

The other objects and features of this invention will become understood from the following description with reference to the accompanying drawings.

DETAILED DESCRIPTION OF THE INVENTION

Figure 1:
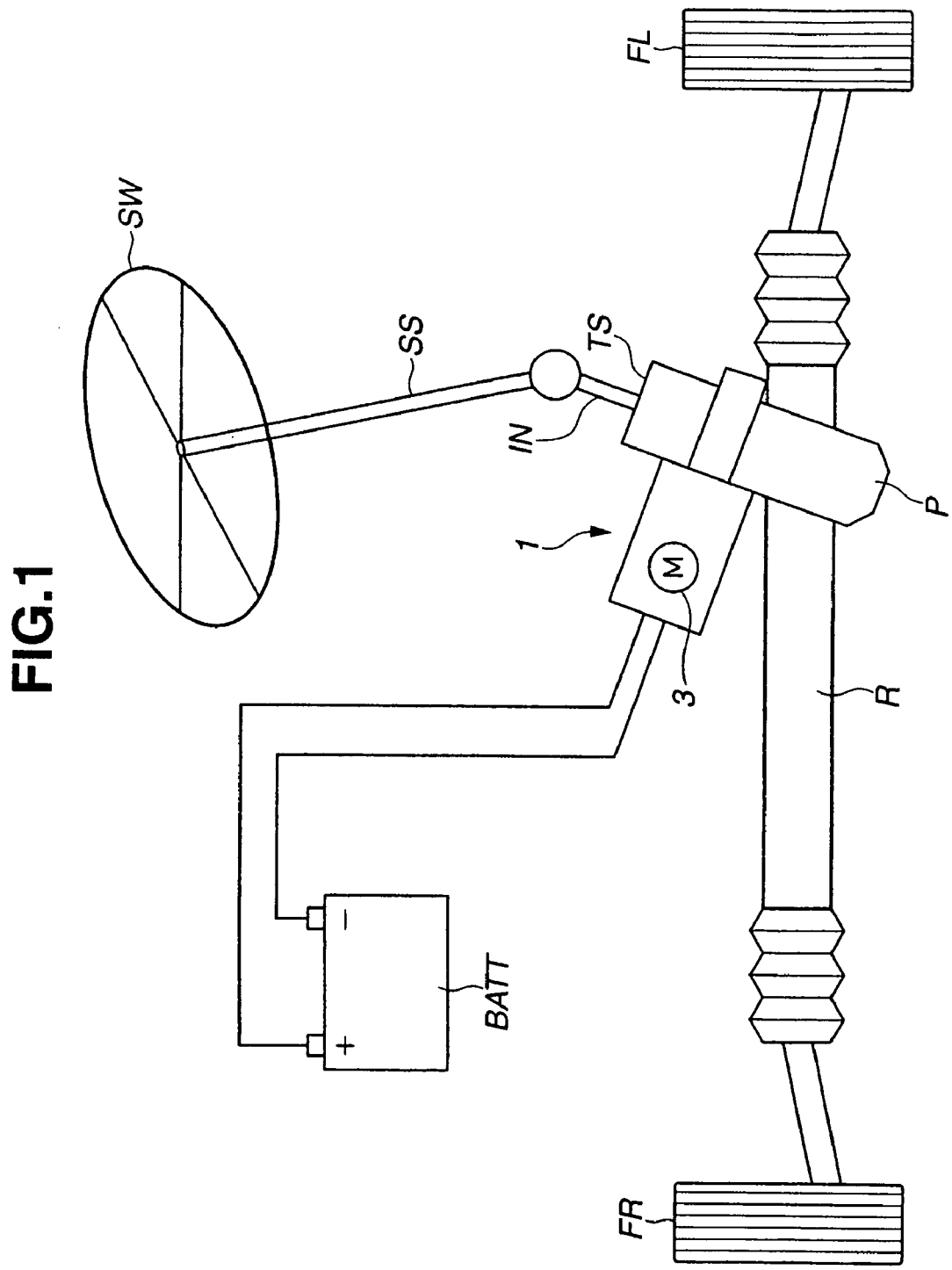
FIG. 1 is a schematic system configuration view of an electric power-steering apparatus employing a motor control apparatus according to the present invention.

Reference will hereinafter be made to the drawings in order to facilitate a better understanding of the present invention. A motor drive apparatus and its inspection method according to the present invention will be explained below based on embodiments of the present invention, referring to the drawings.

First Embodiment

[System Configuration of Electric Power-Steering Apparatus]

A first embodiment according to the present invention will now be explained. FIG. 1 is a schematic system configuration view of an electric power-steering apparatus employing a motor control apparatus (motor drive apparatus) 1 according to the first embodiment. The electric power-steering apparatus includes the motor control apparatus 1, a steering wheel SW, a steering shaft SS, a torque sensor TS, an input shaft IN, rack and pinion (steering mechanism: rack R, pinion P), and steering road wheels (front wheels) FL and FR. The motor control apparatus 1 includes a motor 3 therein, and is driven by a power source BATT.

When the steering wheel SW is steered or manipulated by a driver, the torque sensor TS detects a steering torque (steering wheel torque) through the steering shaft SS and the input shaft IN. A control (circuit) board 400 (see FIG. 3) provided in the motor control apparatus 1 outputs a drive signal based on the detected steering torque, to the motor 3. Thereby, the motor 3 provided in the motor control apparatus 1 is driven to rotate the pinion P and to move the rack R in an axial direction, so that a steering assist is performed. The control board 400 includes a signal board (i.e., a substrate related to control signals) 401 adapted to output the drive signal for the motor 3, and a power board (i.e., a substrate related to power supply) 402 adapted to control or adjust a current of the motor 3 on the basis of this drive signal.

[Sectional Views Relative to X-Y Plane and Y-Z Plane]

Figure 2:
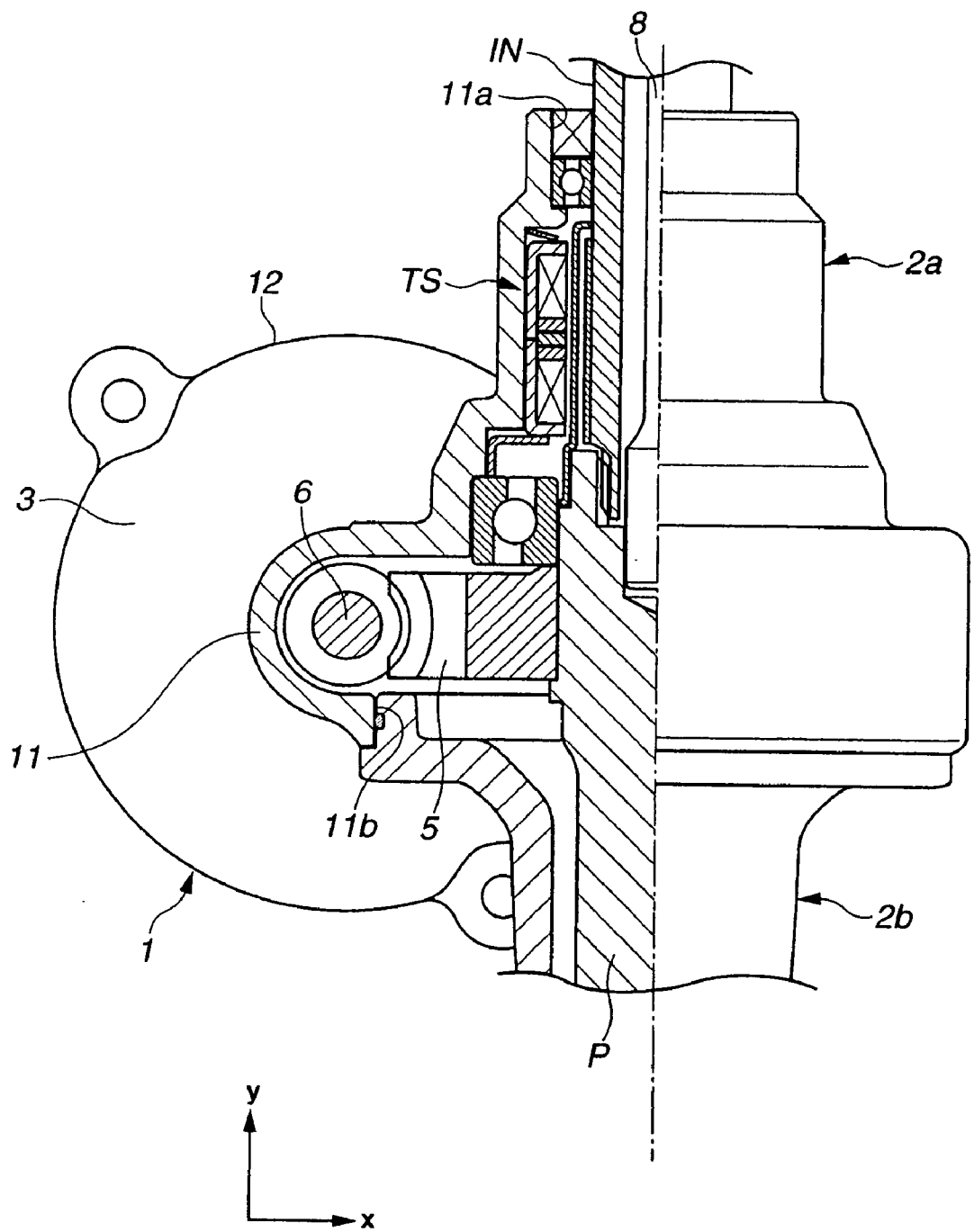
FIG. 2 is a partial cross sectional view of the electric power-steering apparatus, on an x-y plane.
Figure 3:
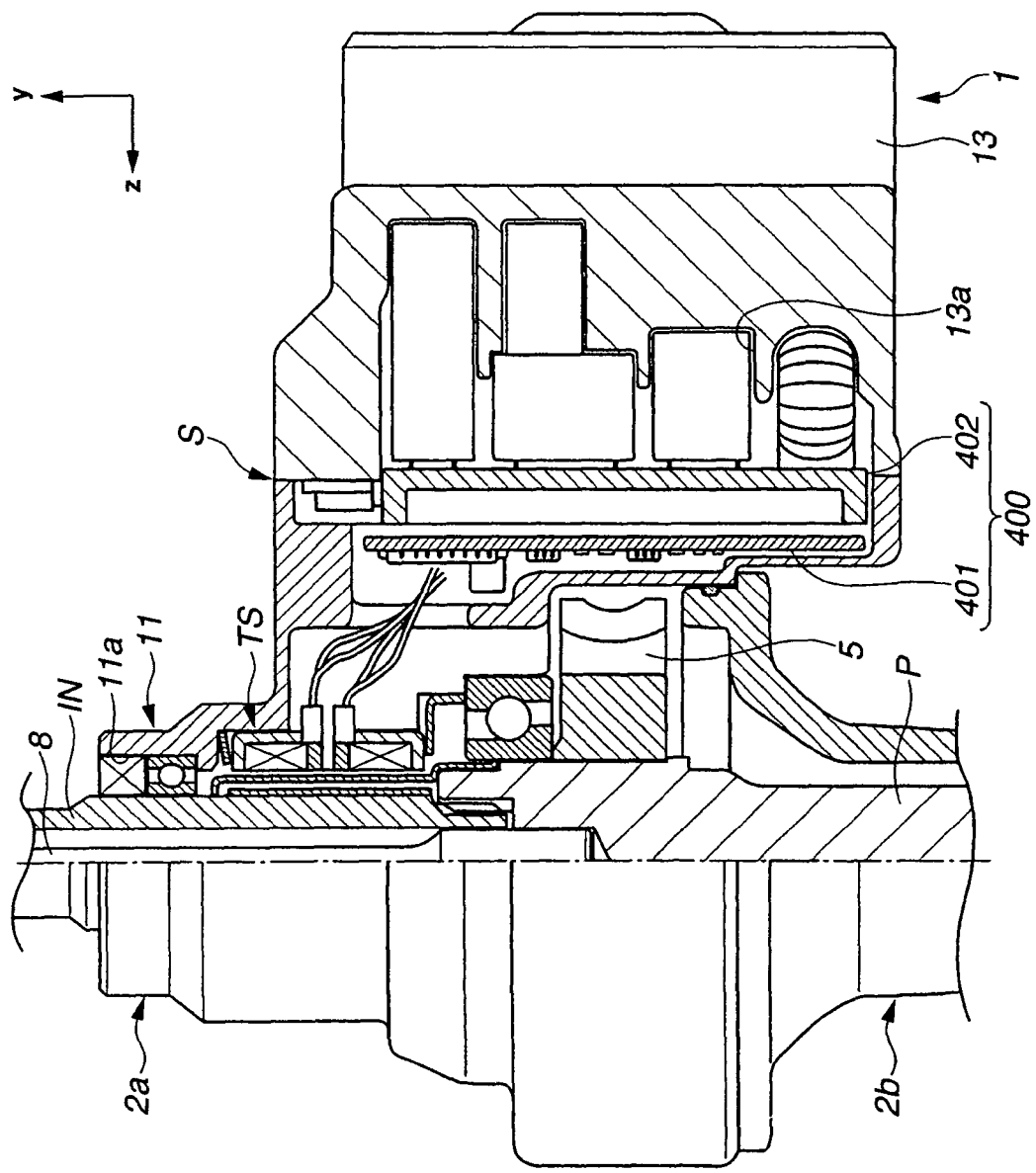
FIG. 3 is a partial cross sectional view of the electric power-steering apparatus, on a y-z plane.
Figure 4:
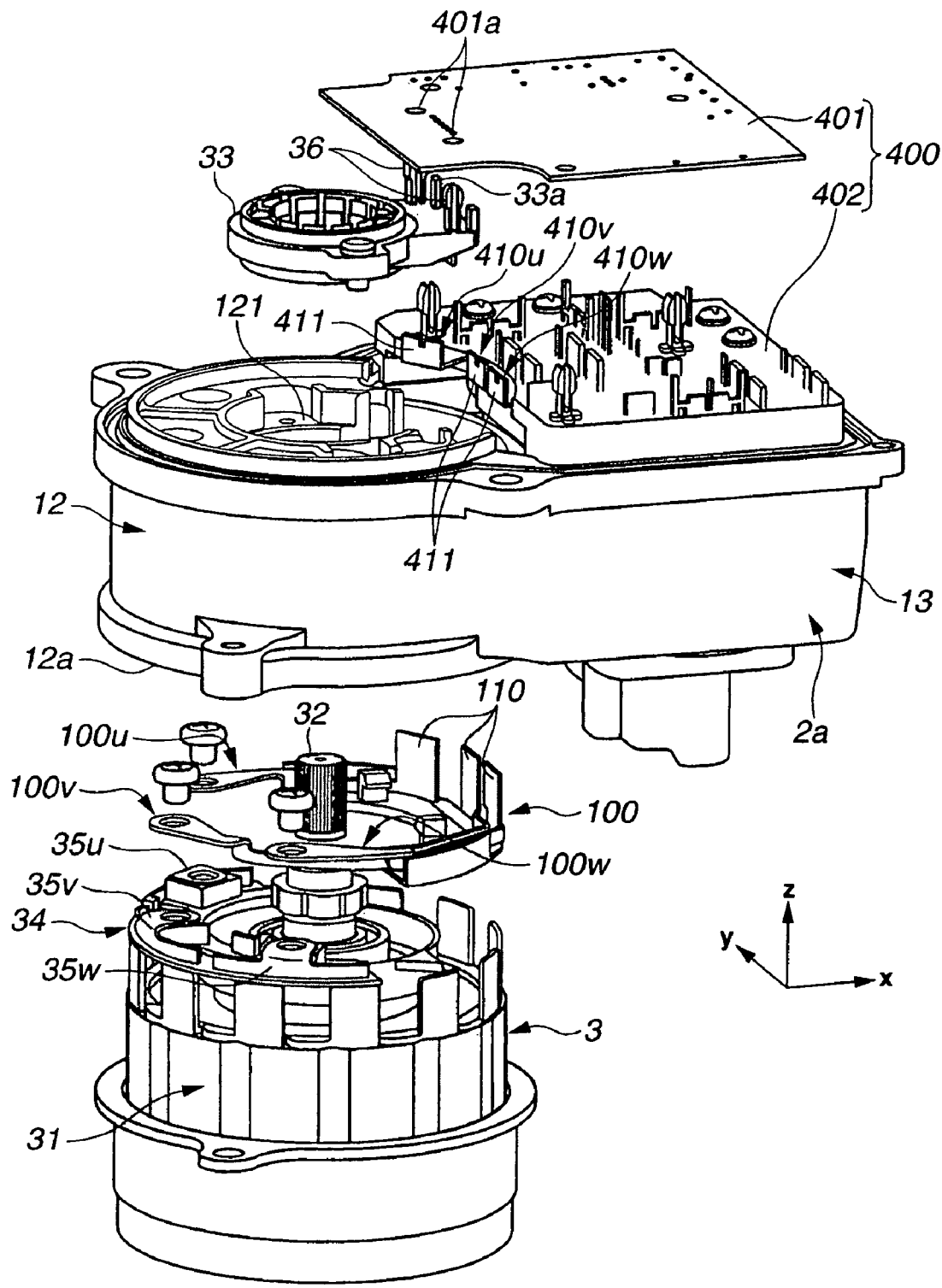
FIG. 4 is an exploded oblique-perspective view of a motor housing.
Figure 5:
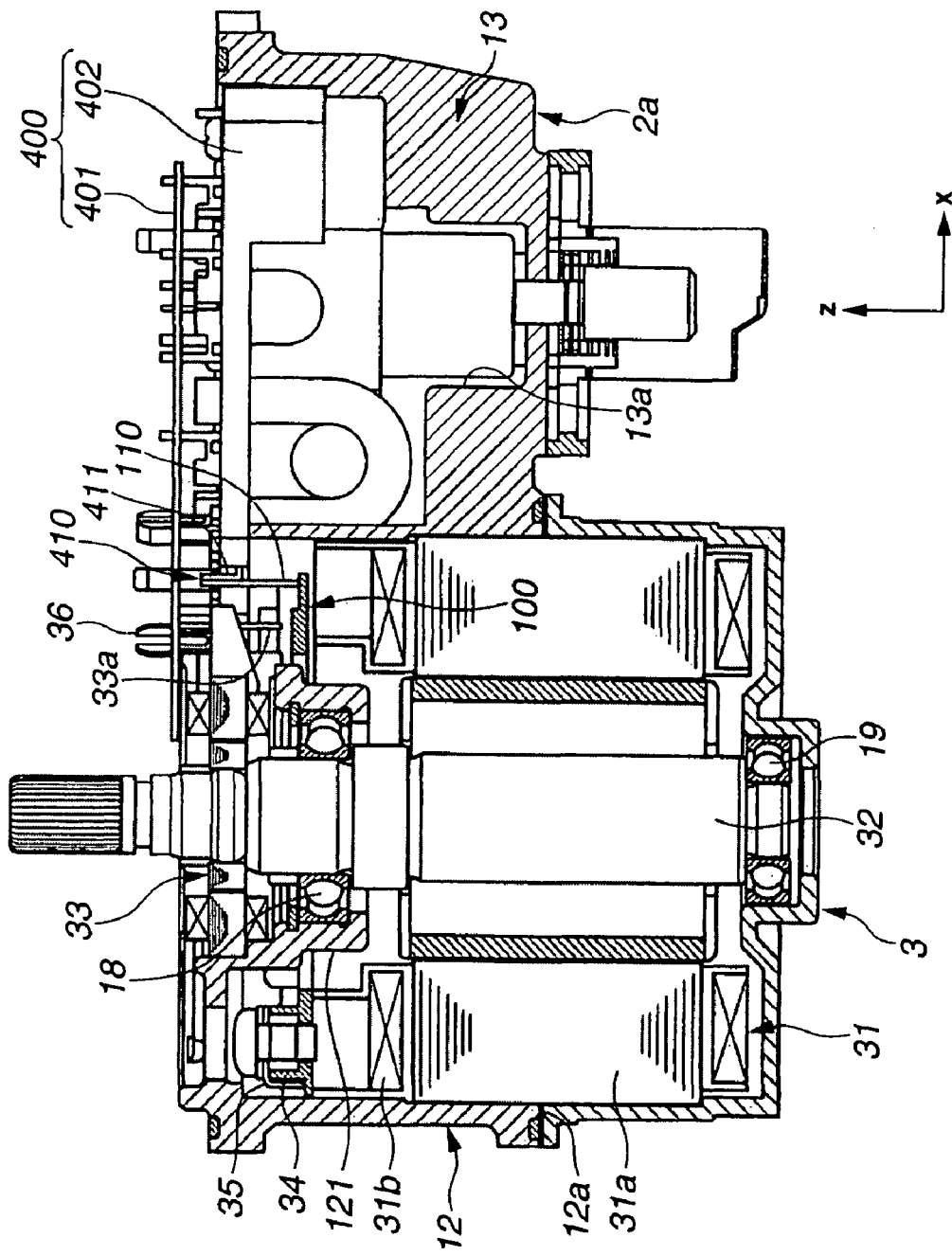
FIG. 5 is a cross sectional view of the motor housing, a motor and the like, on an x-z plane.
Figure 6:
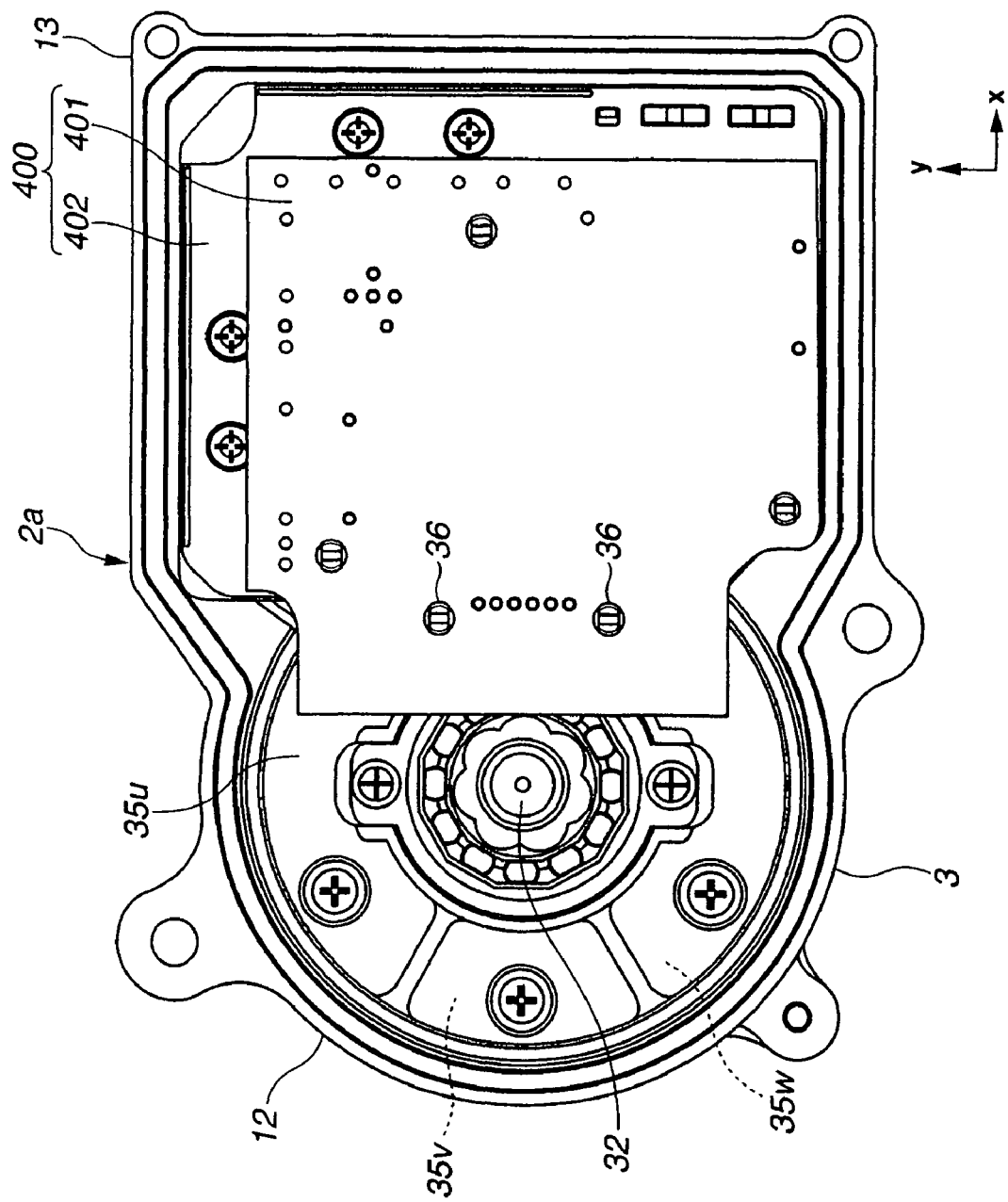
FIG. 6 is a front view of the motor housing, the motor and the like, as viewed from a positive area of z axis.

FIG. 2 is a partial cross sectional view of the electric power-steering apparatus, on x-y plane. FIG. 3 is a partial cross sectional view of the electric power-steering apparatus, on y-z plane. FIG. 4 is an exploded oblique-perspective view of a motor housing 12. FIG. 5 is a cross sectional view of the motor housing 12, the motor 3 and the like, on x-z plane. FIG. 6 is a front view of the motor housing 12, the motor 3 and the like, as viewed from a positive area of z axis (as viewed in a negative direction of z axis).

The y-axis is given in parallel with an axial direction (of input shaft IN) of the electric power-steering apparatus shown in FIG. 2. The x-axis is defined as a direction which is orthogonal to the y-axis and is in parallel with the cross-sectional plane of FIG. 2. The z-axis is defined as a direction which is parallel with a normal line of the cross-sectional plane of FIG. 2. That is, the z-axis is orthogonal to the x-axis and is substantially in parallel with an axial direction of the motor 3.

The motor control apparatus 1 includes a first housing 2a, a second housing 2b, the input shaft IN, the pinion P, a worm wheel 5, a worm shaft 6, the torque sensor TS, and a rotation sensor 33. The signal board 401 is provided perpendicularly to the worm shaft 6. The signal board 401 is connected with the torque sensor TS, the power board 402, and the rotation sensor 33 for detecting a rotation of motor 3.

When carrying out the steering assist, a driving force of motor 3 is transmitted to the worm wheel 5 through the worm shaft 6 disposed on a rotation axis of the motor 3. The worm shaft 6 is engaged or meshed with the worm wheel 5 adapted to rotate integrally with the pinion P. This pinion P is connected with the rack R on the negative side of the y-axis. Thus, the driving force of motor 3 drives the rack R as a steering assist force.

[Detailed Description about First Housing]

The first housing 2a includes a gear housing 11, the motor housing 12 and a board housing 13. The motor housing 12 is formed integrally with the board housing 13. The motor housing 12 is provided on the negative side of z-axis beyond the gear housing 11. The board housing 13 is provided on the negative side of z-axis beyond the gear housing 11, and on the positive side of x-axis beyond the motor housing 12. That is, the board housing 13 is located at a more negative position than the gear housing 11 relative to z-axis, and also is located at a more positive position than the motor housing 12 relative to x-axis.

(Gear Housing)

The gear housing 11 is formed in a cup shape having its bottom. The gear housing 11 is formed with a through-hole 11a provided in its bottom surface located in the y-axis positive side of gear housing 11. The input shaft IN passes through the through-hole 11a. Moreover, the gear housing 11 is formed with an opening portion 11b provided in the y-axis negative side of gear housing 11. From this opening portion 11b, the gear housing 11 covers or encloses the pinion P, the worm wheel 5, the signal board 401 and the torque sensor TS, in order.

The input shaft IN is a hollow circular cylinder (tube) member. A torsion bar 8 is provided inside the input shaft IN. This input shaft IN is connected with the steering wheel SW through the steering shaft SS, and is also connected with the pinion P through the torsion bar 8. Moreover, inside the gear housing 11, the torque sensor TS is provided on the outer peripheral side of the input shaft IN. The torque sensor TS serves to detect a relative rotation between the input shaft IN and the pinion P caused according to the steering (manipulation) of the driver, and serves to output this detected signal to the signal board 401.

(Motor Housing)

As shown in FIG. 4, the motor housing 12 accommodates or receives the motor 3. The motor housing 12 opens at an end portion of motor housing 12 relative to the z-axis negative direction, so as to form a motor insertion opening 12a. The motor 3 is inserted through the motor insertion opening 12a. The motor housing 12 includes a wall portion 121 at an end portion of motor housing 12 relative to the z-axis positive direction. The rotation sensor 33 is attached to the wall portion 121 from the z-axis positive side of wall portion 121.

(Rotation Sensor)

The rotation sensor 33 is located adjacent to the signal board 401 in the z-axis positive side of the motor housing 12, and is located between the motor housing 12 and the signal board 401. This rotation sensor 33 is provided on the side opposite to the motor 3 with respect to a bearing 18 (i.e., is provided at a z-axis positive position beyond the bearing 18). Accordingly, a connectivity between the rotation sensor 33 and the signal board 401 is enhanced.

The rotation sensor 33 includes snap-fits 36 for connecting the signal board 401 with the rotation sensor 33. These snap-fits 36 are inserted into through-holes 401a provided in the signal board 401, so that the signal board 401 is connected with the rotation sensor 33 to enable the signal board 401 to move within a predetermined amount relative to the rotation sensor 33. Therefore, it is unnecessary that the motor housing 12 includes a bolt hole(s) or the like for fixing the signal board 401 thereon, near the signal board 401.

(Motor)

The motor 3 includes a stator 31 and a rotor (output shaft) 32. The motor 3 is a motor unit adapted to adjust a current of coil 31a of the stator 31, on the basis of a detection value of rotational position of rotor 32 which is detected by the rotation sensor 33. The coil 31a is wound around a bobbin 31b formed of an insulating material. The rotation sensor 33 is placed at an end portion of the rotor 32 relative to the z-axis positive direction, and serves to detect the rotation of rotor 32.

The motor 3 includes a motor-side terminal connecting portion (first terminal connecting portion) 35 located at an end portion of the motor 3 relative to the z-axis positive direction and on a negative side of the motor 3 relative to the x-axis direction. The motor-side terminal connecting portion 35 is connected through a relay terminal 100 with the power board 402 to receive a current supply. This motor-side terminal connecting portion 35 includes terminals 35u, 35v and 35w for respective phases u, v and w. These terminals 35u, 35v and 35w are disposed on a terminal block 34 formed of resin, and are respectively connected with relay terminals 100u, 100v and 100w for respective phases. By installing the terminal block 34; a position-keeping performance is enhanced as well as conducting an insulation between the motor housing 12 and the terminals 35u, 35v and 35w.

The rotor 32 is connected with the worm shaft 6 through a connecting member in a z-axis positive directional area. Moreover, the rotor 32 is rotatably supported through bearing (shaft supporting portion) 19 by the motor housing 12 at an opening portion provided on the z-axis negative side of the motor housing 12. On the other hand, the rotor 32 is rotatably supported through bearing (shaft supporting portion) 18 by the motor housing 12 at the wall portion 121 provided on the z-axis positive side of the motor housing 12. By rotatably supporting the rotor 32 through these bearings 18 and 19, an accuracy of position of the rotor 32 is ensured.

An outer peripheral surface of the terminal block 34 has the same radius as an outer peripheral surface of the bobbin 31b on which the coil 31a is wound. Thereby, inside the motor housing 12, an assembling workability between the bobbin 31b and the terminal block 34 is improved.

The relay terminal 100 is provided on the motor 3's side beyond the wall portion 121. Since the wall portion 121 is interposed between the control board 400 and the relay terminal 100 carrying a large current, a safety of the control board 400 is enhanced.

(Board Housing)

The board housing 13 is an aluminum die-cast member formed in consideration of a heat-radiation performance. The board housing 13 accommodates or receives the power board 402 therein. As shown in FIG. 3, the board housing 13 includes an element receiving portion 13a for holding a plurality of power elements which are provided on the power board 402. The element receiving portion 13a receives or accommodates the power elements independently at predetermined positions.

This element receiving portion 13a is formed so as to fit each of the power elements of power board 402. That is, the element receiving portion 13a is shaped such that respective positional relations among the power elements are determined only by setting the power elements into the element receiving portion 13a. Moreover, an insulation sheet is stuck on a fitting (receiving) surface of the element receiving portion 13a in order to ensure an electrical insulation.

At the time of assembly, at first, respective elements of power board 402 are held in the element receiving portion 13a. As mentioned above, respective positional relations of the power elements are determined only by disposing the power elements into the element receiving portion 13a. Then, the power board 402 is put to cover the board housing 13 under the state where the power elements are held in the element receiving portion 13a. Accordingly, the power elements can be easily disposed at their predetermined positions on the power board 402, so that a soldering for the power elements becomes easy.

[Second Housing]

The second housing 2b accommodates or receives the pinion P from a y-axis negative area, and fills or blocks the opening portion 11b of the first housing 2a.

[Control Board]

As mentioned above, the control board 400 includes the signal board 401 adapted to output the drive signal for the motor 3, and the power board 402 adapted to control the current of the motor 3 on the basis of this drive signal.

The signal board (i.e., substrate related to control signals) 401 is located between the power board 402 and the worm wheel 5, namely, between the motor 3 and the worm wheel 5. The signal board 401 is provided in parallel with the x-y plane, namely is perpendicular to the worm shaft 6. This signal board 401 outputs the drive signal based on the steering torque (value) detected by the torque sensor TS, to the power board 402.

The connection between the control board 400 and the motor 3 is achieved by the relay terminal 100. The signal board 401 is located on the side on which the rotation sensor 33 is located, namely, at an end portion of the motor 3 relative to the z-axis positive direction. An output terminal 33a of the rotation sensor 33 is provided to extend in the z-axis positive direction which is the axial direction of the motor 3. This output terminal 33a is almost perpendicularly connected with the signal board 401.

Since the signal board 401 overlaps with the power board 402 in the z-axis direction, the signal board 401 is directly connected with the rotation sensor 33 by the output terminal 33a parallel to the z-axis. Accordingly, it is not necessary to provide a connecting terminal or the like as an additional component.

[Power Board]

The power board (i.e., substrate related to power supply) 402 is located adjacent to the signal board 401 inside the first housing 2a, and is electrically connected with the signal board 401 through harness, connector or the like. This power board 402 includes a board-side terminal connecting portion (second terminal connecting portion) 410 for respective phases u, v and w. The board-side terminal connecting portion 410 is connected with the relay terminal 100 by welding.

Connecting terminals 411 are provided onto the board-side terminal connecting portion 410. These connecting terminals 411 attached to the board-side terminal connecting portion 410 are welded to the relay terminal 100. Each connecting terminal 411 itself to be directly connected with the power board 402 is designed to be relatively small, so that an automatization of welding operation is easily conducted.

Since the power board 402 is directly connected with the relay terminal 100, it is not necessary to provide a member for connection as an additional component. Moreover, a connecting surface of the board-side terminal connecting portion 410 is disposed substantially in parallel with a vertical surface 110 which is a connecting surface of the relay terminal 100, so that a workability at the time of welding is improved.

The power board 402 is located outwardly in a radial direction of motor 3, namely is located in the x-axis positive direction of motor 3. The power board 402 conforms to (is placed in the same position as) an extending portion of the signal board 401 in a circumferential direction of motor 3. That is, the power board 402 is disposed so as to overlap with the signal board 401 in the z-axis direction. By disposing in such a manner, the connection between the signal board 401 and the power board 402 is easily conducted.

The terminal block 34 is located in a position opposed to the board-side terminal connecting portion 410 in the diametrical direction of motor 3, namely, is located on the motor 3 at a side opposite to the board-side terminal connecting portion 410 in the x-axis direction. There are provided a lot of connecting parts for the rotation sensor 33 and the like densely in an area around the terminal block 34. Therefore, by placing the board-side terminal connecting portion 410 apart from the terminal block 34, a degree of freedom of layout is enhanced as well as improving an assembling workability and reliability.

[Relay Terminal and Motor-Side Connecting Terminal]

Figure 7:
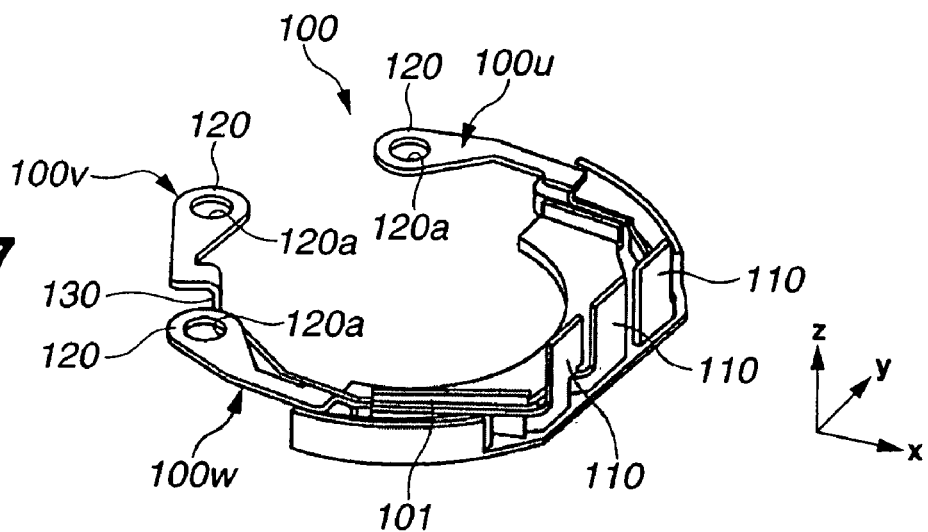
FIG. 7 is an oblique perspective view of a relay terminal.
Figure 8:
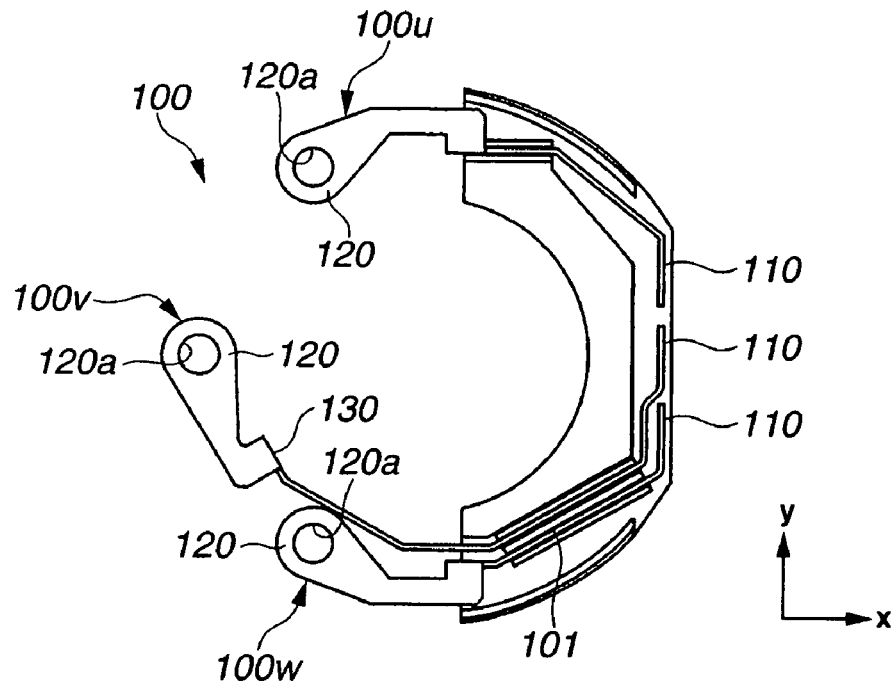
FIG. 8 is a front view of the relay terminal as viewed from the positive side of z-axis.
Figure 9:
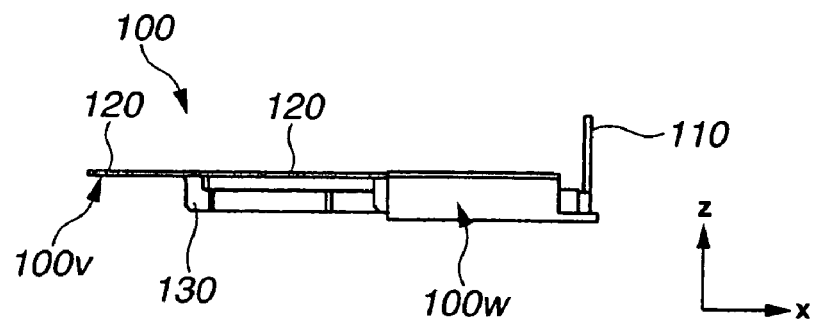
FIG. 9 is a front view of the relay terminal as viewed from the negative side of y-axis.
Figure 10:
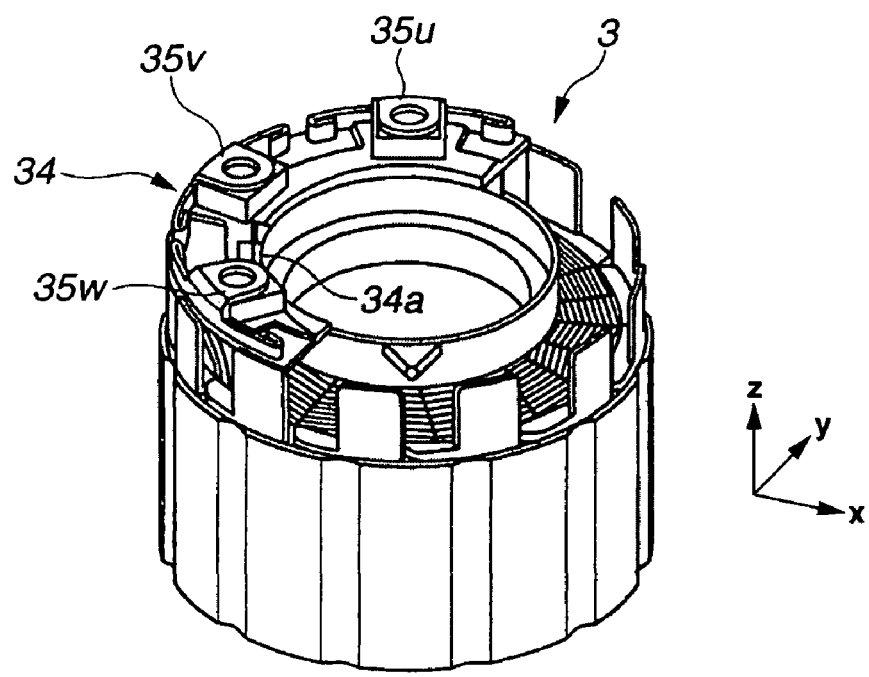
FIG. 10 is an oblique perspective view of the motor on a standalone.
Figure 11:
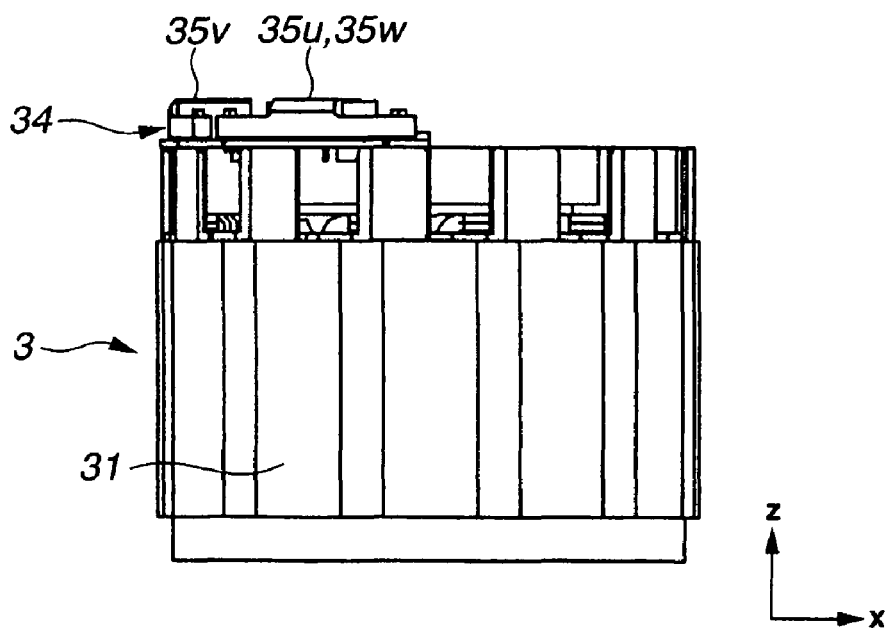
FIG. 11 is a front view of a motor-side terminal connecting portion as viewed from the negative side of y-axis.
Figure 12:
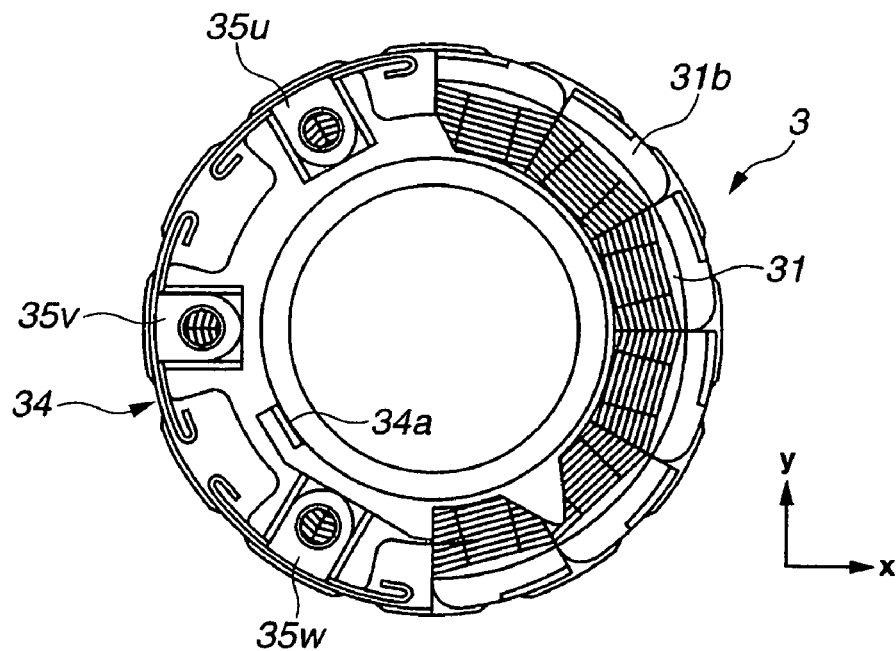
FIG. 12 is a front view of the motor-side terminal connecting portion as viewed from the positive side of z-axis.
Figure 13:
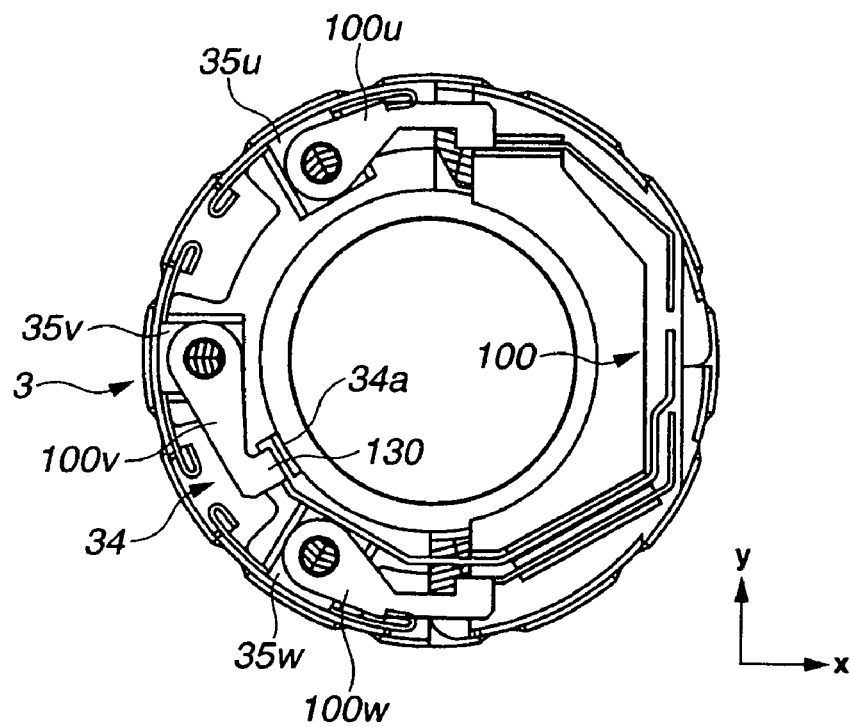
FIG. 13 is a front view as viewed from the positive side of z-axis, under the state where the relay terminal has been installed to the motor.

FIGS. 7 to 9 are views showing the relay terminal 100. FIG. 7 is an oblique perspective view. FIG. 8 is a front view as viewed from the positive side of z-axis. FIG. 9 is a front view as viewed from the negative side of y-axis. Moreover, FIGS. 10 to 13 are views showing the motor-side terminal connecting portion 35. FIG. 10 is an oblique perspective view of the motor 3 as viewed on a standalone. FIG. 11 is a front view as viewed from the negative side of y-axis. FIG. 12 is a front view as viewed from the positive side of z-axis. FIG. 13 is a front view as viewed from the positive side of z-axis, under the state where the relay terminal 100 is installed to the motor 3.

The relay terminal 100 includes terminals 100u, 100v and 100w for respective phases. Each terminal 100u, 100v or 100w is formed by processing a conductive metal plate or the like by means of press working. The terminals 100v and 100w for phases v and w which are adjacent to each other are disposed to sandwich an insulating material 101. Thus, the relay terminals 100u, 100v and 100w for respective phases are provided integrally with one another while maintaining their insulations from one another.

The relay terminal 100 includes the vertical surfaces 110 perpendicular to the radial direction (the x-y plane) of motor 3, and circular-arc shaped portions 120 parallel to the x-y plane. Each vertical surface 110 is connected with the board-side terminal connecting portion 410 by means of welding. Each arc shaped portion 120 is formed with a screw hole 120a. The relay terminal 100 is connected with the terminal block 34 by screws B passing through respective screw holes 120a.

Since the arc shaped portions 120 are provided in parallel with the x-y plane, the arc shaped portions 120 are also substantially in parallel with an inner peripheral surface of the motor housing 12. That is, each arc shaped portion 120 is formed in an arc shape designed along the inner peripheral surface of the motor housing 12. Such a parallel arrangement of the arc shaped portions 120 absorbs or offsets errors in dimensions which are caused in the board-side terminal connecting portion 410 in both of axial and radial directions of motor 3, at the time of assembly.

The relay terminal 100v for phase V includes a positioning portion 130, at a root of the arc shaped portion 120 of the relay terminal 100v. The positioning portion 130 serves for a positioning function for the relay terminal 100 by engaging with the terminal block 34. This positioning portion 130 is a step portion which was formed when providing the arc-shaped portion 120 by bending an x-axis-negative-directional end portion of the relay terminal 100v for phase V. On the other hand, the terminal block 34 includes an engaging portion 34a at a spot corresponding to the positioning portion 130. Thus, the position (location) of the relay terminal 100 is determined by engaging the positioning portion 130 with the engaging portion 34a.

[Exploded Perspective View]

Figure 14:
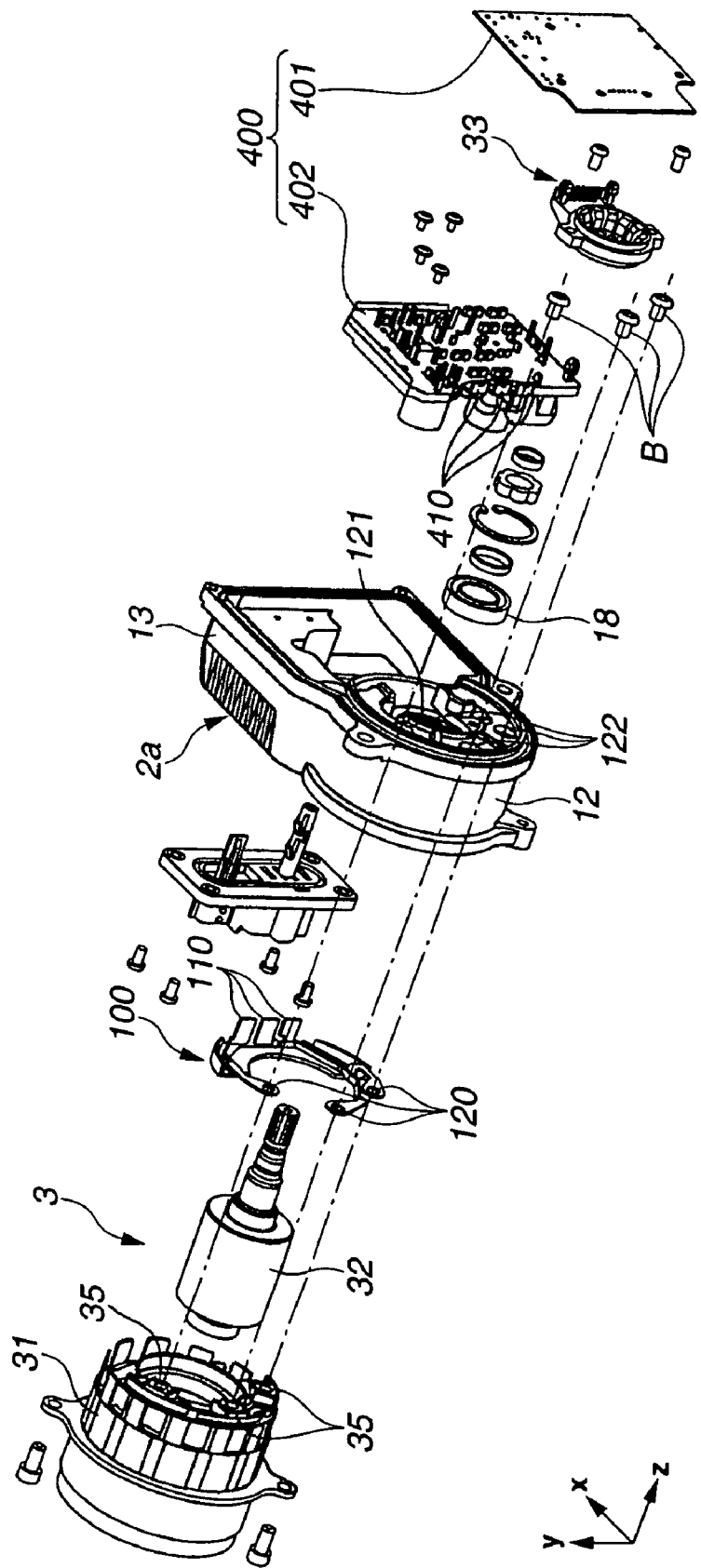
FIG. 14 is an exploded oblique-perspective view of the motor housing and the motor.

FIG. 14 is an exploded oblique-perspective view of the motor housing 12 and the motor 3. As mentioned above, the relay terminal 100 is connected with the terminal block 34 by the screws B. Even after the assembly, just the motor 3 can be detached by loosening screws B. Accordingly, a degree of freedom in an inspection operation of the power board 402 is improved.

The wall portion 121 is formed with through-holes 122 for the screws B. Each of these through-holes 122 is formed to have a radius enabling a tool (e.g., screwdriver) for tightening the screw B to pass through the through-hole 122. Accordingly, the screws B can be screwed or tightened through these through-holes 122, after putting (setting up) the motor 3 and the relay terminal 100 into the motor housing 12.

[Inspection Method for Apparatus]

In the motor drive apparatus according to the present invention, the first housing 2a includes the motor housing 12 accommodating the motor 3, and the board housing 13 accommodating the signal board 401 and the power board 402. These motor housing 12 and board housing 13 are integrally formed with each other. Accordingly, the motor 3 is connected with respective signal board 401 and power board 402 inside the first housing 2a, so that a downsizing of the motor drive apparatus is achieved.

However, when supplying electric current to the respective boards 401 and 402 in order to inspect the respective boards 401 and 402 without detaching the motor 3 after the assembly of the apparatus, the motor 3 cannot help but rotate in response to this electric-current supply, since the motor 3 and the respective boards 401 and 402 are provided inside (one integrally-formed housing of) the first housing 2a. This worsens a workability of the inspection.

Therefore in this embodiment, the wall portion 121 is formed to expose the through-holes 122 in the z-axis positive direction of first housing 2a even after attaching the respective boards 401 and 402 to the first housing 2a. That is, this embodiment according to the present invention employs a structure capable of easily detaching or removing the motor 3 from the first housing 2a even after the assembly of the apparatus. Accordingly, the inspection workability for the respective boards 401 and 402 is enhanced. Moreover, by moulding the motor housing 12 for the motor 3 integrally with the board housing 13 for the control board 400, a drastic downsizing of the apparatus is achieved.

(First Step: Preliminary Assembling for Subassembly)

At first, the relay terminal 100 and the motor 3 are attached (i.e., assembled) to the first housing 2a from the z-axis negative side. Then, the bearing 18, the rotation sensor 33 and the respective boards 401 and 402 are attached to the first housing 2a from the z-axis positive side of the first housing 2a.

The relay terminal 100 and the motor 3 are fixed from the z-axis negative side by using the screws B. The wall portion 121 includes the through-holes 122 for the insertion and fastening of the screws B. As mentioned above, these through-holes 122 are provided to become exposed to the outside on the z-axis positive side of the motor housing 12 (i.e., exposed in the z-axis positive direction) even after the respective boards 401 and 402 have been mounted to the board housing 13 (formed integrally with the motor housing 12).

(First Step-1: Connection of Relay Terminal)

During the preliminary assembling step, the relay terminal 100 is connected with the power board 402. Since the relay terminal 100 is connected with the power board 402 at the time of preliminary assembly, the state where the relay terminal 100 has been already connected with the power board 402 is obtained at the time of inspection (a third Step). By welding the relay terminal 100 to the power board 402, the welding between the relay terminal 100 and the power board 402 is finished before the inspection thereof.

(First Step—2: Mounting of Rotation Sensor)

Moreover, during the preliminary assembling step; the rotation sensor 33 for detecting the rotational state of output shaft of the motor 3 is connected with the control board 400, and is also attached into the wall portion 121. Since the rotation sensor 33 is connected to the signal board 401 before the inspection, the inspection of signal board 401 becomes possible under the state where the rotation sensor 33 has been connected with the signal board 401. Moreover, a soldering work of the signal board 401 (connections of elements and the like to be mounted on the signal board 401) is finished before the inspection.

(Second Step: Connection of Inspection Unit)

An inspection unit or system (not shown) is connected with the signal board 401 and the power board 402.

(Third Step: Inspection of Boards)

By inputting an inspection signal (test signals) to the respective boards 401 and 402 from the inspection unit or system, the inspection for the control board 400 (boards 401 and 402) is carried out.

Configurations and Effects according to First Embodiment (1) The motor drive apparatus according to the first embodiment includes the motor 3 including the coil 31a, the stator 31, the rotor (output shaft) 32 and the motor-side terminal connecting portion 35; the control board 400 which includes the board-side terminal connecting portion 410 and which is configured to control a current supply to the motor 3; and the first housing 2a. The first housing 2a includes the motor housing (motor receiving portion) 12 receiving the motor 3, and the board housing (board receiving portion) 13 formed integrally with the motor housing 12. The motor housing 12 is formed with an opening on one side (z-axis negative side) of the motor housing 12 in the axial direction of motor 3, and includes the wall portion 121 on another side (z-axis positive side) of the motor housing 12 in the axial direction. The wall portion 121 is formed with the through-holes 122. The board housing 13 is formed with the opening in the z-axis direction to receive the control board 400. The motor drive apparatus further includes the bearing (shaft supporting portion) 18 which supports the rotor 32 and which is provided at the wall portion 121; and the plurality of relay terminals 100 which are provided via the through-holes 122 of the wall portion 121 and which electrically connect the motor-side terminal connecting portion 35 with the board-side terminal connecting portion 410.

Since the housing for the motor 3 is formed integrally with the housing for the control board 400 as the first housing 2a, a significant downsizing of the motor drive apparatus can be achieved. Moreover, the inspection for the control board 400 becomes possible under the state where the motor 3 has not yet been installed into the motor housing 12 (first housing 2a). Moreover, since the bearing 18 is formed at the wall portion 121 (i.e., is located radially inside the wall portion 121), the positional accuracy at the time of operation of the motor 3 can be ensured.

In the case where the inspection is carried out by passing a current through the respective boards 401 and 402 after the assembly (building up) of the apparatus, if the motor 3 cannot be disconnected, the motor 3 is made to rotate in response to the current supply for the inspection so that the inspection workability is worsened. Therefore, in the embodiment according to the present invention, the through-holes 122 are exposed on the z-axis positive side of the first housing 2a (i.e., exposed in the z-axis positive direction) even after the respective boards 401 and 402 have been mounted. Thereby, the motor 3 becomes capable of being easily disconnected from the first housing 2a even after the assembly of the motor drive apparatus. Accordingly, by disconnecting the motor 3 even after the assembly of the apparatus, the inspection workability of the respective boards 401 and 402 can be improved.

(2) The motor drive apparatus according to the first embodiment further includes the rotation sensor 33 provided at the wall portion 121. This rotation sensor 33 is adapted to detect the rotational state of the rotor 32 and adapted to output the detection signal to the control board 400. Accordingly, a motor control based on the output signal of the rotation sensor 33 can performed.

(3) The rotation sensor 33 is located on the side opposite to the motor 3 with respect to the bearing 18. Accordingly, the connectivity between the rotation sensor 33 and the control board 400 can be improved.

(4) The control board 400 is provided to overlap with the output terminal of the rotation sensor 33 in the radial and axial directions of the motor 3. Accordingly, the control board 400 can be directly connected with the rotation sensor 33, so that it is not necessary to provide a connecting member separately.

(5) The relay terminal 100 (100u, 100v and 100w) is connected with the motor-side terminal connecting portion 35 by means of the screws B. Accordingly, after the assembly, the motor 3 can be dismounted by loosening the screws B. The degree of freedom in inspection steps of the control board 400 is improved.

(6) The relay terminal 100 (100u, 100v and 100w) is provided between the motor 3 and the wall portion 121; and the wall portion 121 is formed with the through-holes 122 respectively located at positions corresponding to (screw holes of motor 3 and the screw holes 120a of relay terminal 100 for) the screws B. Accordingly, a tool such as a screwdriver can be inserted through the through-holes 122 to tighten the screws B.

(7) The motor-side terminal connecting portion 35 is located at a position opposed to the board-side terminal connecting portion 410 in the diametrical direction of the motor 3. A lot of connecting portions for the rotation sensor 33 and the like are provided densely in an area around the motor-side terminal connecting portion 35. Therefore, by placing the board-side terminal connecting portion 410 apart from the motor-side terminal connecting portion 35, the degree of freedom of layout is enhanced as well as improving the assembling workability and reliability.

(8) The relay terminal 100 is directly connected with the control board 400. Accordingly, it is not necessary to provide an extra member for connecting the relay terminal 100 with the control board 400. Therefore, the number of components can be reduced.

(9) The plurality of connecting terminals 411 provided between the board-side terminal connecting portion 410 and the relay terminal 100 electrically connect the board-side terminal connecting portion 410 with the relay terminal 100. Accordingly, each connecting terminal 411 itself to be directly connected with the control board 400 can be provided in a relatively small shape, so that the automatization of welding work can be implemented.

(10) The plurality of connecting terminals 411 are provided in parallel with the respective connecting surfaces of the relay terminals 100$u$, 100$v$ and 100$w$. By virtue of such a parallel arrangement, the welding operation to the relay terminals 100$u$, 100$v$ and 100$w$ becomes easy.

(11) The relay terminals 100$u$, 100$v$ and 100$w$ are provided between the motor 3 and the wall portion 121. Since the wall portion 121 is interposed between the control board 400 and the relay terminal 100 (100$u$, 100$v$ and 100$w$) carrying a large current, the safety of control board 400 is secured.

(12) The plurality of relay terminals 100$u$, 100$v$ and 100$w$ are provided on the side opposite to the motor 3 with respect to the wall portion 121. Since the relay terminal 100 is located on the side of control board 400 beyond the wall portion 121 (i.e., located in a more positive position than the wall portion 121 relative to z-axis), the workability when connecting inspection equipments to the relay terminal 100 is enhanced.

(13) The motor 3 includes the engaging portion 34$a$ adapted to engage with the positioning portion 130 of the relay terminal 100 (100$u$, 100$v$ and 100$w$). Since the position of the relay terminal 100 is determined by this engagement, a connecting workability in the board-side terminal connecting portion 410 is favorable.

(14) The insulating material 101 is sandwiched between the plurality of relay terminals 100$u$, 100$v$ and 100$w$. Accordingly, the fear of short-circuit among the relay terminals 100$u$, 100$v$ and 100$w$ can be avoided.

(15) Each of the relay terminals 100$u$, 100$v$ and 100$w$ includes the vertical surface 110 which is perpendicular to the radial direction of the motor 3 and which is connected with the board-side terminal connecting portion 410; and the circular-arc shaped portion 120 which is located between this vertical surface 110 and the motor-side terminal connecting portion 35 and which is formed in an arc shape along the inner peripheral surface of the motor housing 12. Accordingly, the dimension errors in both of axial and radial directions of motor 3 which are caused at the time of assembly in the board-side terminal connecting portion 410 can be absorbed.

(16) The motor drive apparatus according to the first embodiment further includes the terminal block 34 formed of resin. The terminal block 34 is provided inside the motor housing 12 and holds the relay terminal 100 (100$u$, 100$v$ and 100$w$). Accordingly, a position-keeping performance for the relay terminal 100 is enhanced, and a short-circuit between the relay terminal 100 and the first housing 2$a$ can be avoided.

(17) The coil 31$a$ is wound around the bobbin 31$b$ formed of an insulating material. Moreover, the outer peripheral surface of the bobbin 31$b$ has the substantially same radius as that of the outer peripheral surface of the terminal block 34. Accordingly, the assembly performance between the bobbin 31$b$ and the terminal block 34 inside the motor housing 12 can be improved.

(18) As another aspect according to the first embodiment, the motor drive apparatus includes the rotation sensor 33 provided at the wall portion 121 and adapted to detect the rotational state of rotor 32; and the control board 400 which includes the board-side terminal connecting portion 410 and which is configured to control a current supply to the motor 3 and is received by the board housing 13; and the plurality of relay terminals 100 (100$u$, 100$v$ and 100$w$) which are provided via the through-holes of the wall portion 121 and which electrically connect the motor-side terminal connecting portion 35 with the board-side terminal connecting portion 410.

Since a housing for the motor 3 is integral with a housing for the control board 400 as the first housing 2$a$, a significant downsizing of the apparatus can be achieved. Moreover, the inspection for the control board 400 becomes possible under the state where the motor 3 is not installed. Moreover, since the rotation sensor 33 is provided onto the wall portion 121, the accuracy of mounting position of the rotation sensor 33 can be ensured.

(19) The motor drive apparatus further includes the bearing 18 which supports the rotor 32 and which is provided at the wall portion 121. The bearing 18 is located at the side of motor 3 beyond the rotation sensor 33. Accordingly, the connectivity between the rotation sensor 33 and the control board 400 is enhanced.

(20) According to the first embodiment of the present invention, the inspection method for a motor drive apparatus includes a first step of assembling a subassembly having the control board 400 and the first housing 2$a$; a second step of connecting a terminal of inspection unit to the control board 400; and a third step of carrying out the inspection of the control board 400 by inputting test signals from the inspection unit to the control board 400. Accordingly, since the motor housing 12 for the motor 3 is formed integrally with the board housing 13 for the control board 400 as the first housing 2$a$, a significant downsizing of the apparatus can be achieved. Moreover, the inspection of the control board 400 becomes possible under the state where the motor 3 is detached.

(21) The first step of assembling the subassembly includes the operation of connecting the control board 400 with the relay terminal 100 for connecting the control board 400 with the motor 3. Accordingly, the inspection of the control board 400 becomes possible under the state where the relay terminal 100 has been connected with the control board 400. Hence, the welding operation between the relay terminal 100 and the control board 400 can be finished before the inspection.

(22) The first step of assembling the subassembly further includes the operation of connecting the control board 400 to the rotation sensor 33 for detecting the rotational state of the rotor 32 of the motor 3, and the operation of attaching the rotation sensor 33 to the wall portion 121. Accordingly, the inspection for the control board 400 can be carried out under the state where the rotation sensor 33 has been connected with the control board 400. Moreover, the soldering work of the control board 400 can be finished before the inspection.

Other Embodiments

Figure 15:
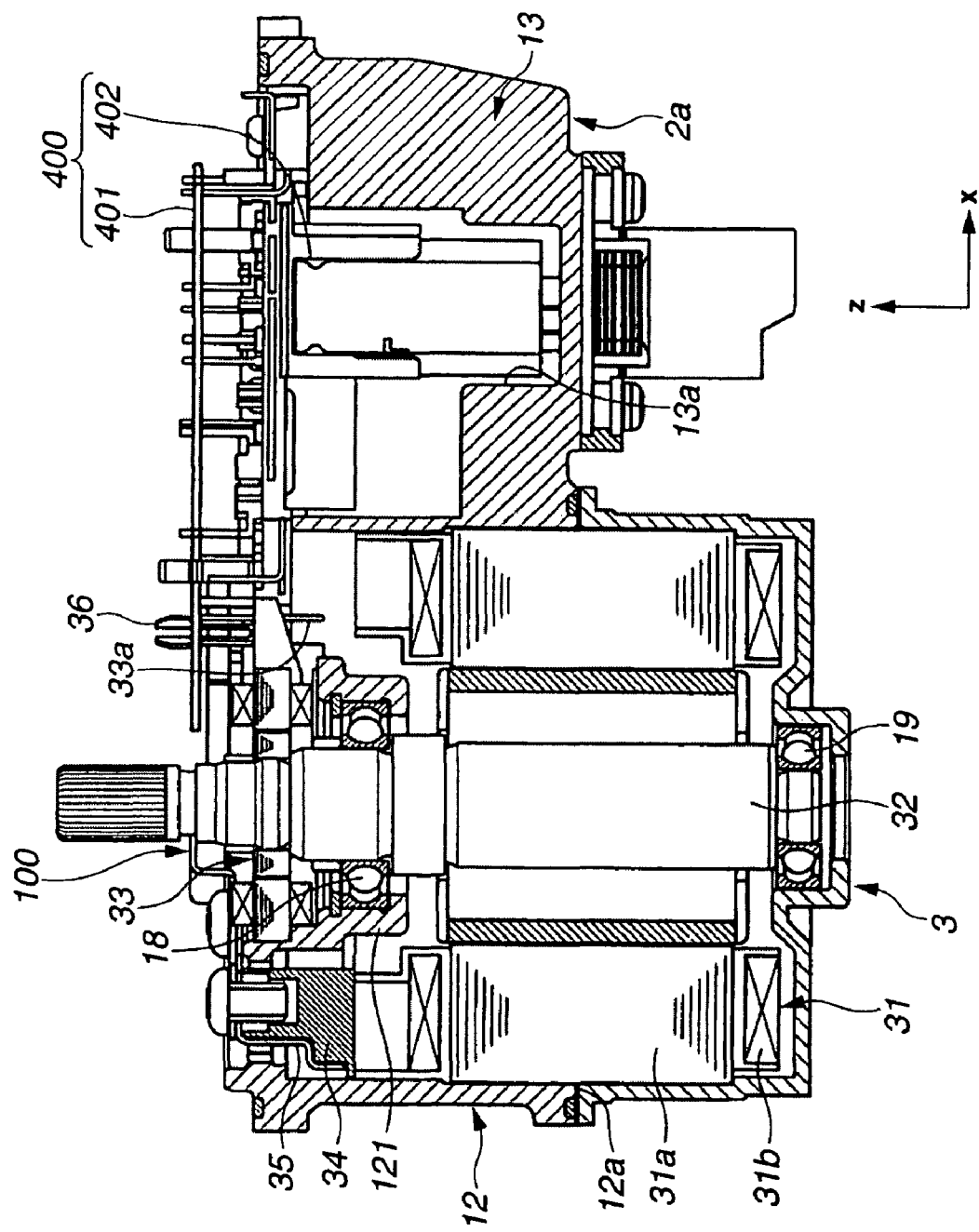
FIG. 15 is a cross sectional view of a motor housing, a motor and the like on an x-z plane, according to a second embodiment of the present invention.
Figure 16:
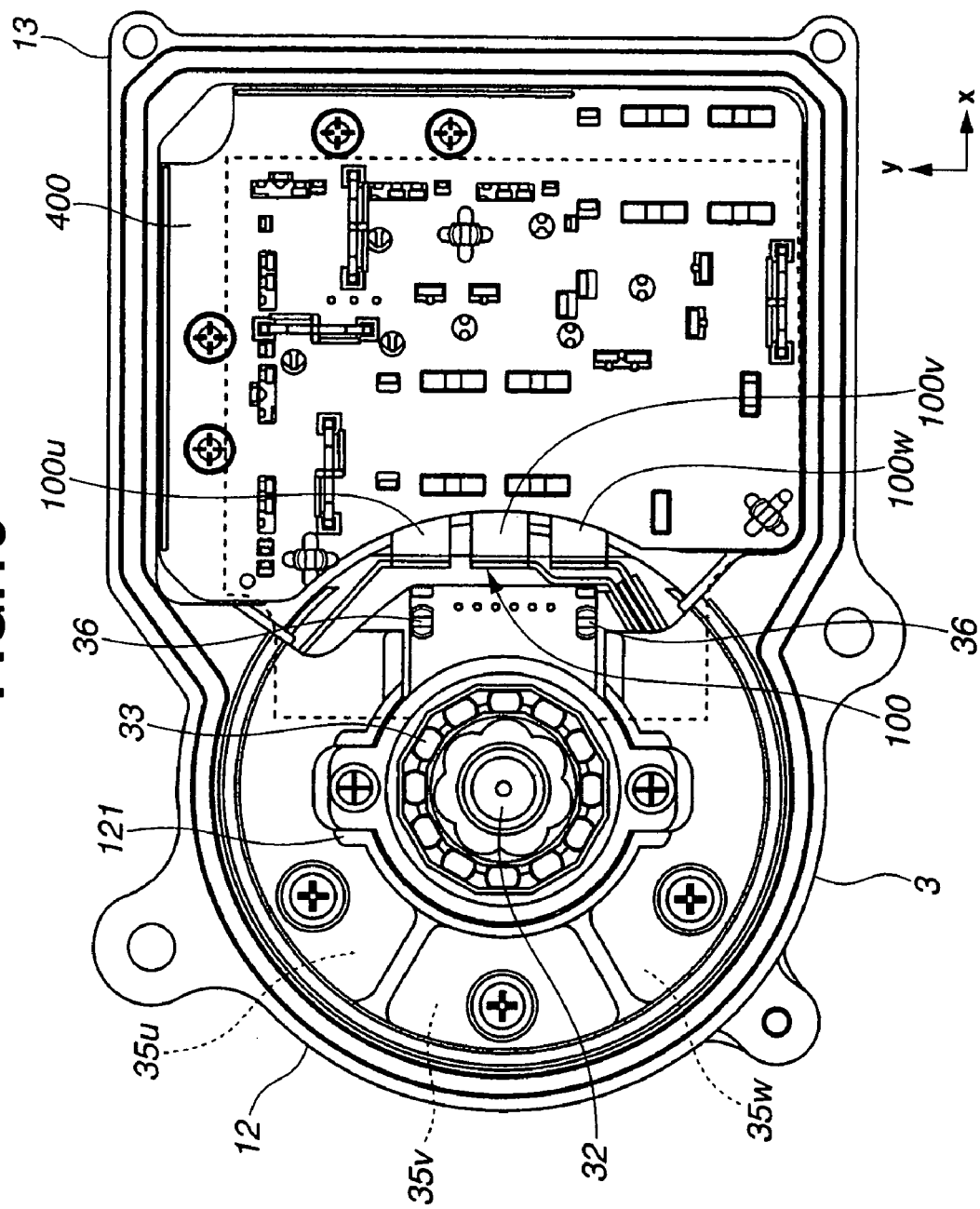
FIG. 16 is a front view of the motor housing, the motor and the like under the state where a signal board has been detached, as viewed from a positive side of z axis, according to the second embodiment.
Figure 17:
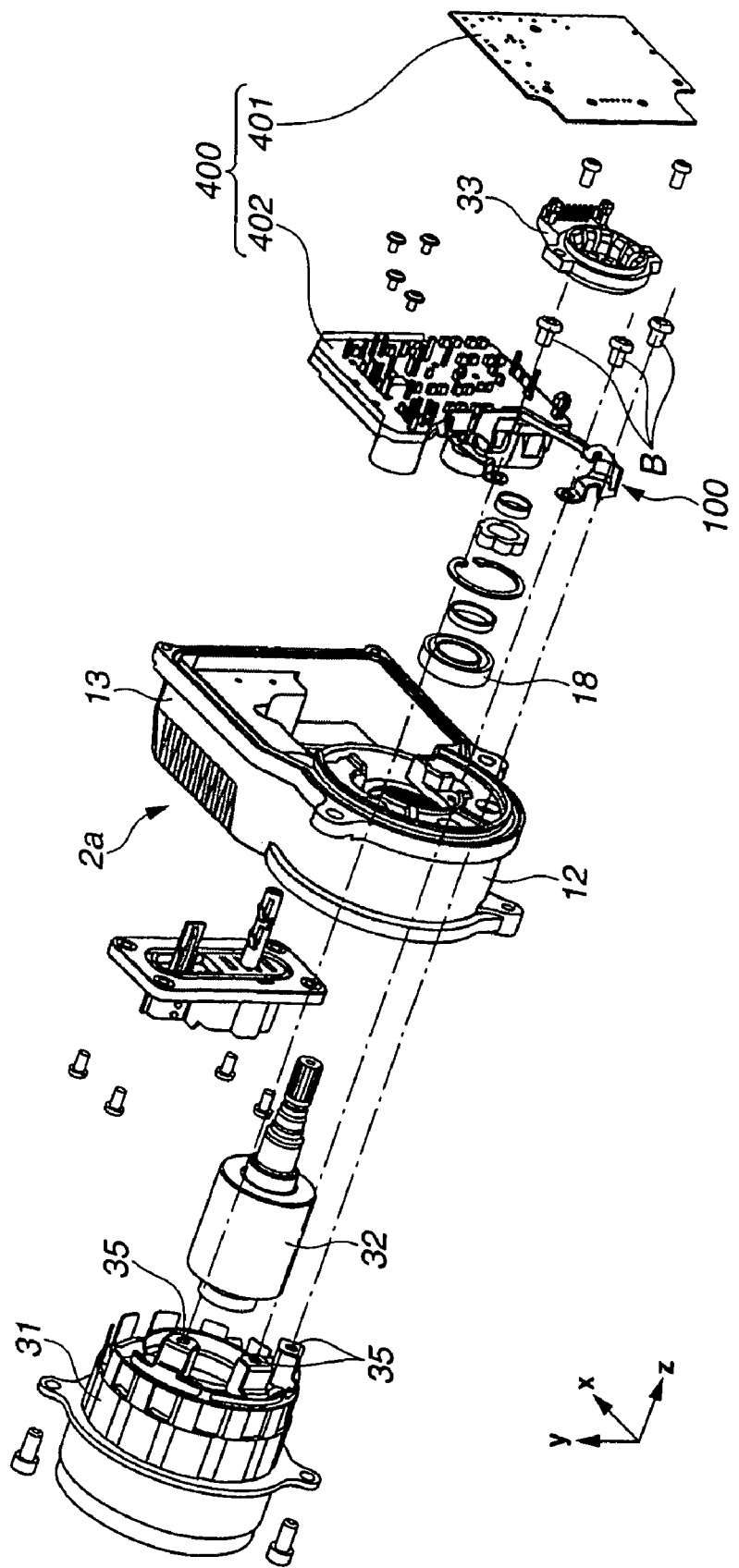
FIG. 17 is an exploded oblique-perspective view of the motor housing, the motor and the like according to the second embodiment.

Although the invention has been described above with reference to certain embodiments of the invention, the invention is not limited to the embodiments described above. Modifications and variations of the embodiments described above will occur to those skilled in the art in light of the above teachings. For example, as shown in FIGS. 15 to 17, the relay terminal 100 may be provided integrally with the power board 402 in advance. In this case, the relay terminal 100 is located at a more positive position than the wall portion 121 of the first housing 2a and the bearing 18 relative to the z-axis. By integrally providing in advance, the connecting step (e.g., welding operation) between the relay terminal 100 and the power board 402 can be omitted.

This application is based on prior Japanese Patent Application No. 2007-186533 filed on Jul. 18, 2007. The entire contents of this Japanese Patent Application are hereby incorporated by reference.

The scope of the invention is defined with reference to the following claims.

What is claimed is:

1. A motor drive apparatus comprising:
   a motor unit comprising a coil, a stator, an output shaft and a first terminal connecting portion;
   a control board comprising a second terminal connecting portion, the control board being configured to control a current supply to the motor unit;
   a housing comprising
      a motor-unit receiving portion receiving the motor unit, the motor-unit receiving portion being formed with an opening on one side of the motor-unit receiving portion in an axial direction of the motor unit and comprising a wall portion on another side of the motor-unit receiving portion in the axial direction, the wall portion being formed with a through-hole, and
      a board receiving portion formed integrally with the motor-unit receiving portion, the board receiving portion being formed with an opening in the axial direction to receive the control board;
   a shaft supporting portion supporting the output shaft, the shaft supporting portion being provided at the wall portion; and
   a plurality of relay terminals provided via the through-hole of the wall portion, the plurality of relay terminals electrically connecting the first terminal connecting portion with the second terminal connecting portion.

2. The motor drive apparatus as claimed in claim 1, further comprising
   a rotation sensor provided at the wall portion, the rotation sensor being adapted to detect a rotational state of the output shaft and adapted to output the detection signal to the control board.

3. The motor drive apparatus as claimed in claim 2, wherein the rotation sensor is located on a side opposite to the motor unit with respect to the shaft supporting portion.

4. The motor drive apparatus as claimed in claim 2, wherein the control board is provided to overlap with an output terminal of the rotation sensor in a radial direction of the rotation sensor.

5. The motor drive apparatus as claimed in claim 1, wherein the plurality of relay terminals are connected with the first terminal connecting portion by means of screws.

6. The motor drive apparatus as claimed in claim 5, wherein the plurality of relay terminals are provided between the motor unit and the wall portion; and
   the wall portion is formed with a plurality of through-holes respectively located at positions corresponding to the screws.

7. The motor drive apparatus as claimed in claim 5, wherein the first terminal connecting portion is located at a position opposed to the second terminal connecting portion in a diametrical direction of the motor unit.

8. The motor drive apparatus as claimed in claim 1 wherein the plurality of relay terminals are directly connected with the control board.

9. The motor drive apparatus as claimed in claim 1, further comprising
   a plurality of connecting terminals provided between the second terminal connecting portion and the plurality of relay terminals, the plurality of connecting terminals electrically connecting the second terminal connecting portion with the plurality of relay terminals.

10. The motor drive apparatus as claimed in claim 9, wherein
    the plurality of connecting terminals are provided substantially in parallel with respective connecting surfaces of the plurality of relay terminals.

11. The motor drive apparatus as claimed in claim 1, wherein
    the plurality of relay terminals are provided between the motor unit and the wall portion.

12. The motor drive apparatus as claimed in claim 1, wherein
    the plurality of relay terminals are provided on a side opposite to the motor unit with respect to the wall portion.

13. The motor drive apparatus as claimed in claim 1, wherein
    the motor unit comprises a positioning portion determining a position of the plurality of relay terminals.

14. The motor drive apparatus as claimed in claim 1, further comprising
    an insulating material sandwiched between the plurality of relay terminals.

15. The motor drive apparatus as claimed in claim 1, wherein
    each of the plurality of relay terminals comprises
       a vertical surface perpendicular to a radial direction of the motor unit, the vertical surface being connected with the second terminal connecting portion, and
       an arc-shaped portion located between the vertical surface and the first terminal connecting portion, the arc-shaped portion being formed in an arc shape along an inner peripheral surface of the motor-unit receiving portion.

16. The motor drive apparatus as claimed in claim 1, further comprising
    a terminal block formed of a resin, the terminal block holding the plurality of relay terminals inside the motor-unit receiving portion.

17. The motor drive apparatus as claimed in claim 16, wherein
    the coil is wound around a bobbin formed of an insulating material; and
    an outer peripheral surface of the bobbin has the substantially same radius as an outer peripheral surface of the terminal block.

* * * * *